Oct. 27, 1953
H. S. CAMPBELL
2,656,892
AIRCRAFT SUSTAINING ROTOR BLADE WITH SUCTION SYSTEM FOR BOUNDARY LAYER CONTROL
Filed Oct. 19, 1948
2 Sheets-Sheet 1
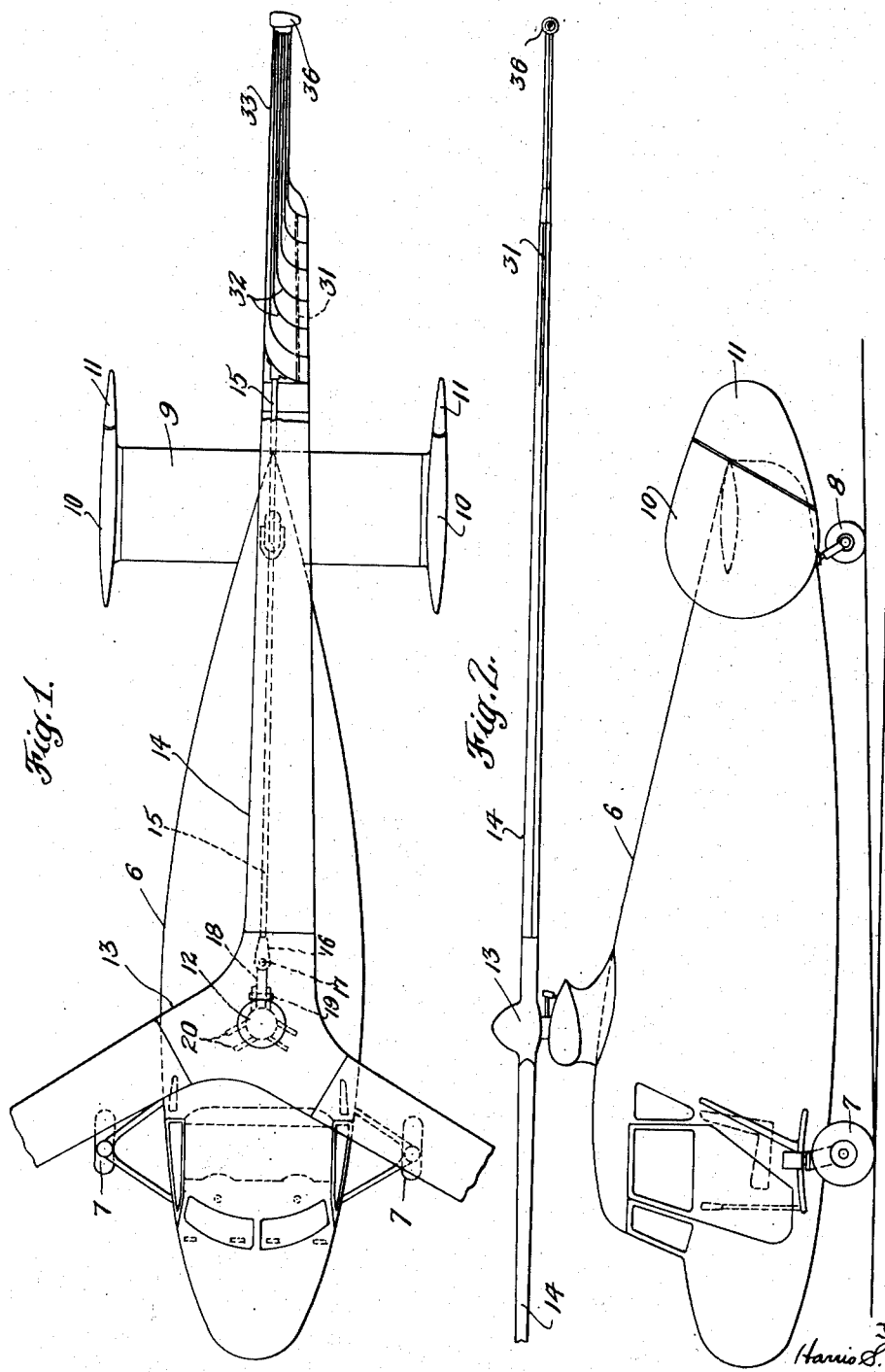
Inventor
Harris S. Campbell
By
Attorneys

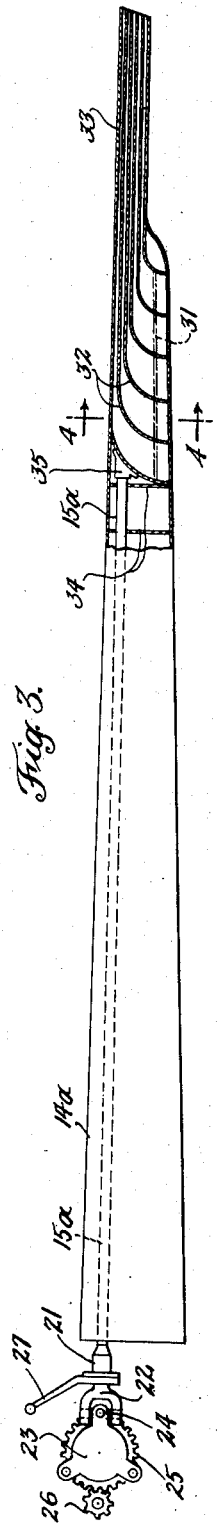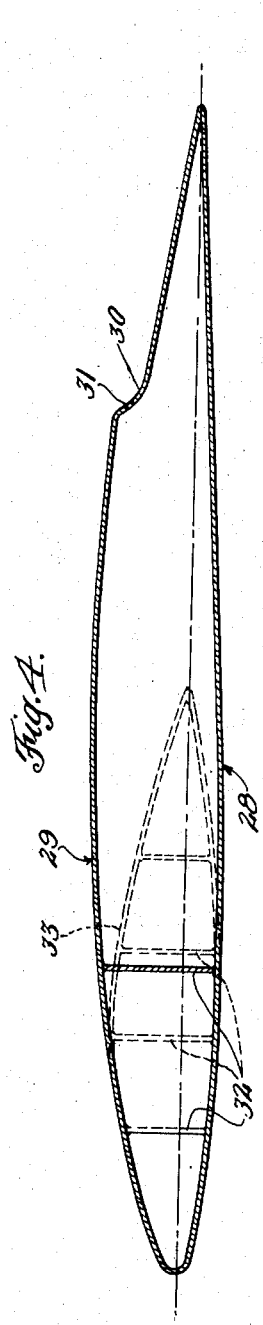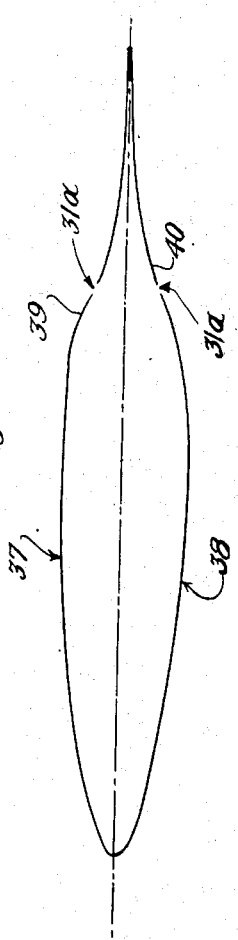

Patented Oct. 27, 1953

2,656,892

UNITED STATES PATENT OFFICE 2,656,892

AIRCRAFT SUSTAINING ROTOR BLADE WITH SUCTION SYSTEM FOR BOUNDARY LAYER CONTROL

Harris S. Campbell, Bryn Athyn, Pa., assignor to Autogiro Company of America, Philadelphia, Pa., a corporation of Delaware Application October 19, 1948, Serial No. 55,254

8 Claims. (Cl. 170—135.4)

This invention relates to aircraft sustaining rotors, and is particularly concerned with a novel sustaining rotor blade construction especially adapted for use in a driven rotor, for instance, a helicopter rotor driven either through the hub or by means of one or more jet driving devices mounted on the blades. Certain features of the invention are especially concerned with the type of rotor in which the blades carry jet driving devices.

In sustaining rotors of the character referred to, a tendency develops for the tip region of the blades to stall, under certain conditions of operation, especially where the rotor blades are of profile providing a particularly advantageous lift-to-drag ratio. It is a principal object of the present invention to provide a system of boundary layer control applicable to the tip region of such rotor blades, whereby to minimize the tendency for blade stalling.

Another object of the invention is concerned with the provision of a suction system associated with blade slots in the tip region of the blade, providing for different suction effect in different regions of the slotting lengthwise of the blade.

In accordance with still another feature of the invention, it is contemplated that the air supply to a blade tip jet be derived from a duct within the blade, which duct is also utilized as a means for setting up suction for drawing air into blade slots, and thereby achieving boundary layer control.

How the foregoing and other objects and advantages are attained will appear more fully from the following description, referring to the accompanying drawings, in which—

Figure 1 is an outline plan view of a rotative wing aircraft, such as a helicopter, incorporating blades constructed according to the present invention, one of such blades being broken out in the tip region thereof to illustrate certain parts lying therein;

Figure 2 is a side elevational view of the aircraft shown in Figure 1;

Figure 3 is a plan view to an enlarged scale of a modified form of rotor blade according to the invention, this view including a modified form of rotor hub and of the boundary layer control system, which latter is broken out and shown in section at the tip of the blade;

Figure 4 is a transverse sectional view on an enlarged scale taken on the line 4—4 of Figure 3, and illustrating one form of blade section preferably utilized, which form may also be incorporated in the arrangement of Figures 1 and 2; and Figure 5 is an outline view of another blade profile which may be employed according to the invention.

Referring first to Figures 1 and 2, the body of a helicopter is indicated at 6. The helicopter may be provided with appropriate landing gear, such as the wheels indicated at 7—7 and 8; and also with fixed and controllable empennage surfaces including a horizontal surface 9, vertical surfaces 10—10 and rudders 11—11.

The rotor is mounted above the body of the aircraft by means of a hub indicated at 12 in Figure 1, which hub, and the root end of the several blades, may be enclosed or faired, as by a flexible fairing 13. Any desired number of blades may be incorporated in the rotor, a suitable number being three, as is illustrated in the drawings. Each of the blades 14 is preferably built up on a main longitudinal strength structure, such as a spar 15, the root end of which has a fitting 16 pivoted by means of a drag pivot 17 to a drag link 18, the drag link in turn being pivoted by a flapping pivot 19 to a pair of apertured lugs 20—20 projecting from the hub 12. Provision may also be made for controllable variation of the blade pitch, in the manner described more fully hereinbelow in connection with the embodiment of Figure 3.

Before considering the arrangement of slotting and suction mechanism employed at the tip of the blades in the embodiments of Figures 1 and 2, reference is made to certain features of the modification of Figure 3. Here it will be seen that a blade 14a is built up on a spar 15a, the root end of which has a fitting 21 serving as an outer member of a pitch change bearing or mounting for the blade, the inner member comprising a radial extension of a blade mounting fork 22. This fork 22 is connected with the hub 23 by a universal joint 24 incorporating both flapping and drag pivots. The blade in the arrangement of Figure 3 is adapted to be hub driven, as by a gear 25 secured to the hub and a cooperating driving pinion 26. Controlled variation of the blade pitch angle is obtainable by means of the control arm 27, which is secured to the pitch change housing 21. Such a control arm may be connected by suitable linkage with a universally tiltable swash ring in a manner well understood in this art. The swash ring may also be vertically shiftable, and thereby pitch control may be secured in two senses, i. e., cyclically and concurrently. Since such pitch control mechanisms are now well understood in this art, they need not be considered in detail herein. It is here mentioned, however, that the problem of blade tip stalling is ordinarily aggravated in a rotor system incorporating provision for cyclic variation of blade pitch (utilized for purposes of maneuvering the aircraft); and therefore the boundary layer control system of the present invention is of especial utility in a rotor system incorporating such blade pitch control.

As best seen in Figures 3 and 4, the profile of one form of blade preferably utilized, is one having a convexly curved lower surface 28 and an upper surface which is in general also convexly curved, as indicated at 29, but which has an abrupt reflex or reversely curved portion 30 located chordwise of the blade intermediate the trailing edge and the mid region. The blade section illustrated in Figure 4 is one having an unusually favorable lift-to-drag ratio when boundary layer control by suction is applied to the abruptly reversely curved portion 30. Thus, this portion of the blade is slotted, as indicated at 31. As seen in Figure 3, the interior of the tip portion of the blade is provided with a series of partitions 32 which extend forwardly from the trailing edge of the blade and curve outwardly, the outer portions thereof being in spaced parallel relation, whereby a plurality of individual ducts are formed within the blade, each communicating with a portion of the slotted region of the tip. By differently proportioning the several ducts, different suction effects may be obtained at different portions of the slotted region of the blade. During rotation of the rotor, the columns of air within the ducts are acted upon by centrifugal force and the air is discharged radially outwardly.

In order to secure a substantial suction effect, the present invention provides for the employment of a blade tip extension, projecting beyond the tip of the blade proper, in which extension the ducts are continued, so as to provide columns of air of appreciable length to be acted upon by centrifugal force. This extension appears in Figures 3 and 4 at 33, and from Figure 4 it will be seen that the blade tip extension is of appreciably narrower chord dimension than the tip portion of the blade, preferably being not in excess of about one-half of the chord dimension of the blade tip. Moreover, as seen in Figure 4, the profile of the tip portion 33 is advantageously of the so-called wedge shaped contour, having a relatively sharp leading as well as trailing edge, this being a type of airfoil section particularly suitable to very high air speeds ranging into the transonic and even supersonic speeds.

With further reference to the blade of Figures 3 and 4, it is noted that a portion of the blade inboard of the slotted region is advantageously built up upon the spar 15a as by employment of ribs such as shown at 34. The spar tube 15a may be terminated in the region of the slotted portion of the blade and provided with a fitting such as shown at 35 for connection with the tip portion of the blade, which is made up of the partitions 32 and appropriate upper and lower blade surface sheets.

It is contemplated that the profile or section of the blade tip and also of the blade tip extension illustrated in Figures 3 and 4 also be employed in the arrangement of Figures 1 and 2, and various parts thereof are therefore only shown in outline in Figs. 1 and 2. In the embodiment of Figures 1 and 2, however, the blades carry jet driving devices such as indicated at 36. The specific construction of such jet driving devices forms no part of the present invention per se, but according to the invention, the outboard ends of the suction ducts formed within the blade tip extension 33 deliver air into the jet devices, for the burning of fuel therein. Thus, in this arrangement, the ducts are utilized not only for developing suction to provide boundary layer control, but in addition for feed of air to the jet driving devices. It may be noted that in Figure 1 the slotted region of the blade is of somewhat greater length than that appearing in Figure 3. This may be advantageous, especially in a jet driven rotor, since the blade tip speed in jet driven rotors is ordinarily higher than in hub driven rotors, as a result of which a greater portion of the tip of the blade approaches the critical speeds at which drag increases. Extending the boundary layer control aids in reducing such drag. It will further be noted that whereas in the arrangement of Figure 3, five ducts are provided in the slotted region of the blade, in the embodiment of Figure 1, six of such ducts are used.

Figure 5 is illustrative of another blade profile which may advantageously be employed in association with the boundary layer control system of the present invention. In this figure, the upper and lower surfaces 37 and 38 of the blade are of similar curvature, each having an abrupt change in curvature in a region intermediate the trailing edge of the blade and the mid region thereof, as shown at 39 and 40. In this form of blade, it is preferred to provide slotting 31a, not only in the upper surface of the blade, but also in the lower surface thereof, in the regions 39 and 40.

I claim:

1. For an aircraft sustaining rotor, a rotor blade having, at least in the tip region of the blade, an abrupt reversely curved portion in the upper surface thereof, said portion being located chordwise intermediate the trailing edge and the mid region of the blade, and the said reversely curved portion having a plurality of slots for intake of air, and air suction mechanism comprising ducts individually communicating with said slots and extending within the blade radially outwardly from the slots for air discharge under the action of centrifugal force acting on the columns of air in the ducts.

2. A construction according to claim 1 and further including a blade tip extension of narrow chord as compared with the tip region of the blade, the said ducts being extended through said extension.

3. A construction according to claim 1 and further including a jet driving device mounted on the blade and receiving air from the outboard ends of said ducts.

4. For an aircraft sustaining rotor, a rotor blade having, at least in the tip region of the blade, an abrupt reversely curved portion in the upper surface thereof, said portion being located chordwise intermediate the trailing edge and the mid region of the blade, and having a slotted air intake in said reversely curved portion, and air suction mechanism comprising a duct communicating with said slotted air intake and extending radially outwardly within the tip portion of the blade, and a blade tip extension of narrow chord as compared with the tip region of the blade, the said duct being extended through said extension for air discharge at the tip thereof under the action of centrifugal force acting on the column of air in the duct.

5. For an aircraft sustaining rotor, a rotor blade having in the tip region of the blade a plurality of slots for the intake of air located chordwise intermediate the trailing edge and the mid region of the blade, and air suction mechanism comprising ducts individually communicating with said slots and extending within the blade radially outwardly from the slots for air discharge under the action of centrifugal force acting on the columns of air in the ducts.

6. A construction according to claim 5 and further including a blade tip extension of narrow chord as compared with the tip region of the blade, the said ducts being extended through said extension.

7. A construction according to claim 5 and further including a jet driving device mounted on the blade and receiving air from the outboard ends of said ducts.

8. A construction in accordance with claim 4 and further including a jet driving device mounted at the tip of said blade tip extension.

HARRIS S. CAMPBELL.

References Cited in the file of this patent

UNITED STATES PATENTS

| Number | Name | Date |
| --- | --- | --- |
| 2,406,920 | Stalker | Sept. 3, 1946 |
| 2,408,632 | Griffith | Oct. 1, 1946 |
| 2,463,864 | Gibson | Mar. 8, 1949 |
| 2,464,651 | Pecker | Mar. 15, 1949 |

FOREIGN PATENTS

| Number | Country | Date |
| --- | --- | --- |
| 404,817 | Great Britain | Jan. 25, 1934 |
| 497,048 | Great Britain | Dec. 12, 1938 |
| 504,718 | Great Britain | April 26, 1939 |
| 807,110 | France | Oct. 12, 1936 |